(12) United States Patent
Magnuson

(10) Patent No.: US 8,292,579 B2
(45) Date of Patent: Oct. 23, 2012

(54) METHOD AND SYSTEM FOR DEICING WIND TURBINE ROTOR BLADES WITH INDUCED TORQUE

(75) Inventor: David Cole Magnuson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/288,278

(22) Filed: Nov. 3, 2011

(65) Prior Publication Data

US 2012/0134804 A1 May 31, 2012

(51) Int. Cl.
*F03D 7/04* (2006.01)

(52) U.S. Cl. .......... 416/39; 416/61; 416/146 R; 416/248

(58) Field of Classification Search .............. 415/1, 118; 416/1, 61, 39, 146 R, 248
See application file for complete search history.

(56) References Cited

U.S. PATENT DOCUMENTS

| 3,779,488 | A  | * | 12/1973 | Levin | 244/134 A |
|---|---|---|---|---|---|
| 4,732,351 | A  | * | 3/1988 | Bird | 244/134 D |
| 6,890,152 | B1 | * | 5/2005 | Thisted | 416/1 |
| 7,309,930 | B2 |   | 12/2007 | Suryanarayanan et al. | |
| 7,423,352 | B2 |   | 9/2008 | Suryanarayanan et al. | |
| 2010/0189560 | A1 |   | 7/2010 | Haraguchi | |
| 2011/0081226 | A1 |   | 4/2011 | Wobben | |
| 2011/0182732 | A1 |   | 7/2011 | Baba | |
| 2011/0280723 | A1 | * | 11/2011 | Libergren | 416/1 |

* cited by examiner

*Primary Examiner* — Ninh Nguyen
(74) *Attorney, Agent, or Firm* — Dority & Manning, P.A.

(57) ABSTRACT

A method and associated system are provided for deicing turbine blades of a wind turbine, wherein rotational torque from a rotor hub on which the turbine blades are mounted is transmitted to a generator. The method and system include detecting conditions that are indicative of ice formation on a wind turbine blade. In response to detected icing conditions, generator torque is modulated so as to induce upstream vibrations in the turbine blades to shake loose ice that may have formed on the turbine blades.

16 Claims, 3 Drawing Sheets

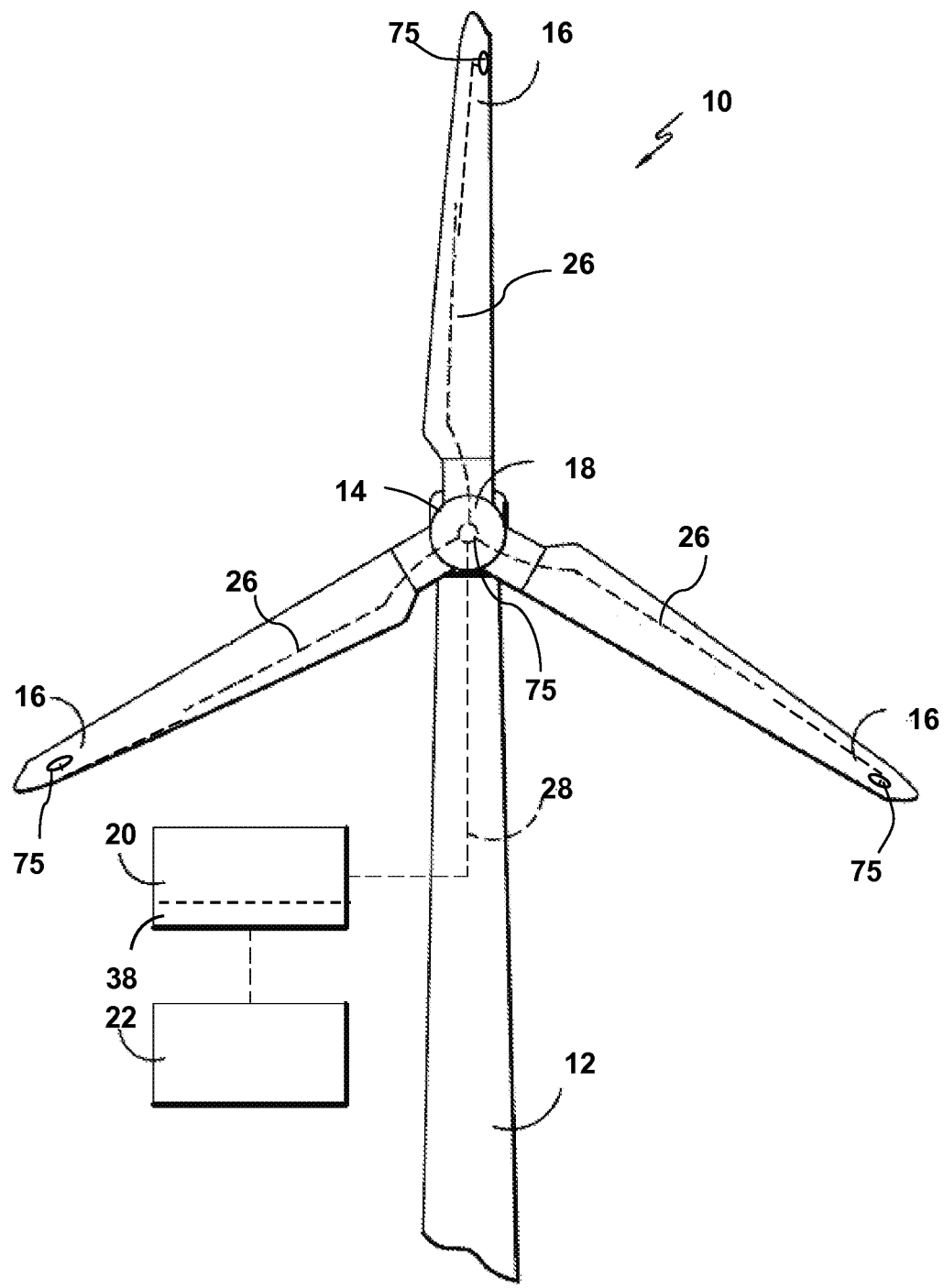
Fig. -1-

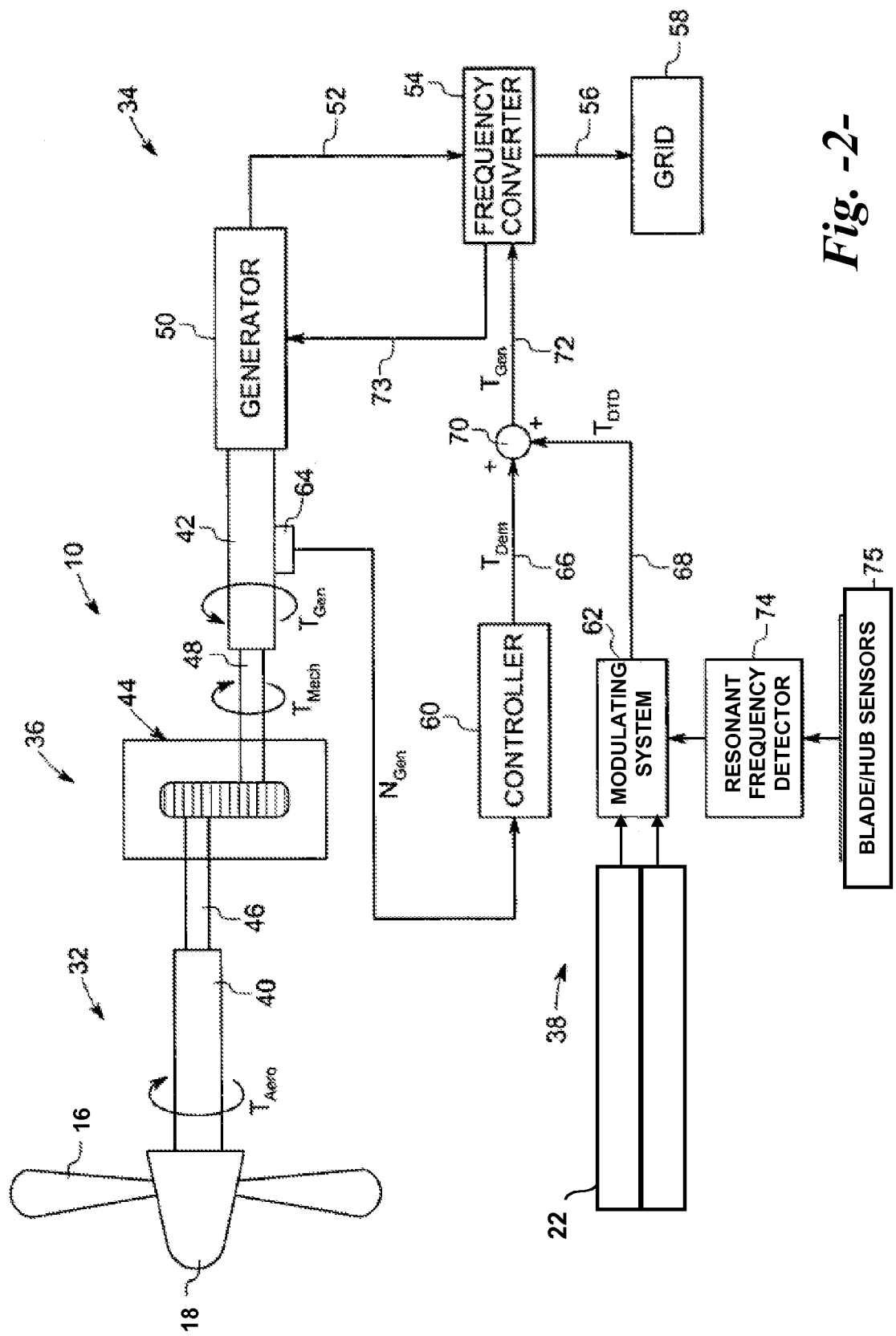
Fig. -2-

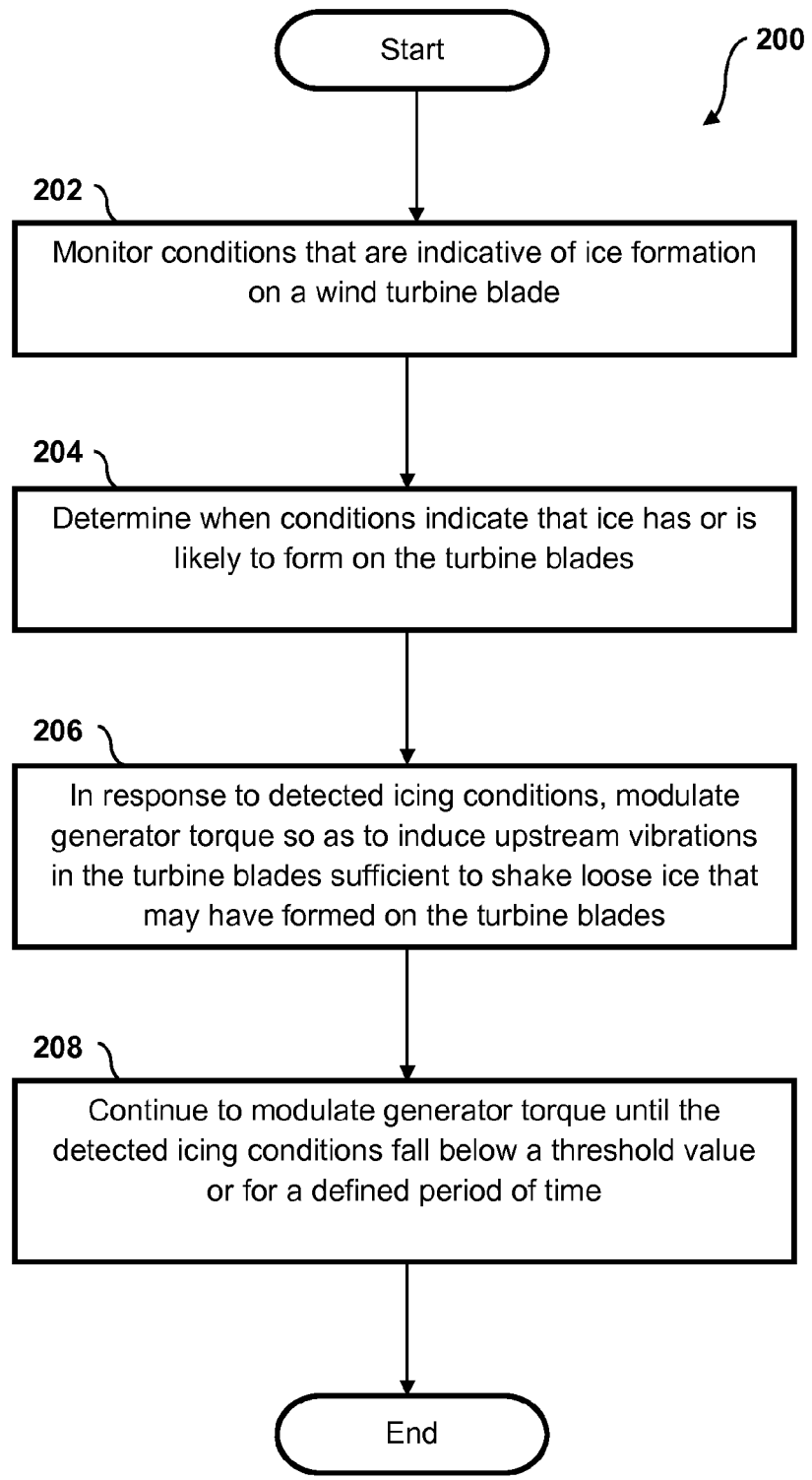
Fig. -3-

METHOD AND SYSTEM FOR DEICING WIND TURBINE ROTOR BLADES WITH INDUCED TORQUE

FIELD OF THE INVENTION

The present disclosure relates in general to wind turbine rotor blades, and more particularly to system and method for deicing a wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The formation of ice on the wind turbine blades adversely affects performance of the wind turbine. At times, icing can be so severe that it prevents the wind turbines from producing power even at ideal wind conditions. In addition, icing produces imbalances in the blades and rotor, which can generate excessive vibrations and stresses in the powertrain components.

Various proposals have been made for deicing wind turbine blades. Reference is made, for example, to U.S. Pat. No. 6,890,152, which suggests to use vibrators configured in the turbine blades to vibrate the blade and cause the ice to break off. The vibrators may be acoustic wage generators, such as sonic horns. U.S. Pat. Appln. Pub. No. 2010/0189560 suggests deicing wind turbine blades by a controlled acceleration and subsequent deceleration of the blades. U.S. Pat. Appln. Pub. No. 2010/0189560 suggests using a pitch angle controller to individually induce rotational vibrations in the respective blades within a predetermined azimuth angle range of the blade.

Accordingly, the industry is continuously seeking new and efficient methods to device wind turbine blades.

BRIEF DESCRIPTION OF THE INVENTION

Aspects and advantages of the invention will be set forth in part in the following description, or may be obvious from the description, or may be learned through practice of the invention.

In one embodiment, a method is provided for deicing turbine blades of a wind turbine, wherein rotational torque from a rotor hub on which the turbine blades are mounted is transmitted to a generator. It should be appreciated that the method is not limited to any particular type or configuration of wind turbine. The method includes detecting conditions that are indicative of ice formation on the wind turbine blades. In response to detected icing conditions (actual or likely icing), the generator is controlled to modulate the torque generated by the generator so as to induce upstream vibrations in the turbine blades, with the vibrations being sufficient to shake loose ice that may have formed on the turbine blades. The method is also not limited to any particular type of generator or drivetrain configuration.

In a particular embodiment, the method may include pitching the turbine blades to a neutral position prior to modulating the generator torque.

To enhance the vibrations induced in the turbine blades, it may in certain embodiments be desired to determine a natural resonant frequency of the turbine blades, and modulate the generator torque at the blade resonant frequency. The resonant frequencies may be determined, for example, by detecting blade vibrations with one or more sensors disposed on the blades or rotor hub, and calculating the resonant frequencies from the detected blade vibrations.

Once initiated, the generator torque modulation may be variously controlled. For example, the modulating process may continue until the detected icing conditions fall below a threshold value. In another embodiment, the modulating process may continue for a defined time period after initiated.

It should be appreciated that the method need not be dependent on the actual formation of ice on the wind turbine blades. For example, the detected conditions may indicate that conditions are favorable for ice formation on the turbine blades, regardless of actual ice formation. At these favorable condition times, the method may be carried out periodically for preventative purposes.

Any one or combination of various operating and environmental conditions may be monitored for detection of icing conditions, including any one or combination of wind speed, rotor speed, power generated by the wind turbine, temperature, or humidity.

The present invention also encompasses any manner of wind turbine configured to operate in a deicing mode, as set forth herein. For example, an exemplary wind turbine may include a modulating system operably coupled to the generator, with the controller configured to modulate generator torque upon detection of conditions that are indicative of ice formation on the turbine blades so as to induce upstream vibrations in the turbine blades to shake loose ice that may have formed on the blades. The modulating system may be in communication with one or more sensors disposed so as to detect operating or environmental conditions that are indicative of ice formation on turbine blades, such as any one or combination of wind speed, rotor speed, power generated by the wind turbine, temperature, or humidity.

In a particular embodiment, the modulating system may be configured to determine a natural resonant frequency of the turbine blades, and to modulate the generator torque at the blade resonant frequency. A motion sensor may be configured with the turbine blades (or rotor) and in communication with the modulating system for transmitting vibrational frequency information that the modulating system uses calculate the blade resonant frequencies.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine that may incorporate a turbine blade deicing capability in accordance with aspects of the invention;

FIG. 2 is a schematic illustration of a wind turbine with a particular embodiment of turbine blade deicing capability; and FIG. 3 is a flow diagram illustrating an embodiment of a method for deicing a wind turbine blade.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of a horizontal axis wind turbine 10 that may be configured with the deicing features in accordance with aspects of the present invention. It should be appreciated that the wind turbine 10 may be a vertical-axis wind turbine. In the illustrated embodiment, the wind turbine 10 includes a tower 12, a nacelle 14 mounted on the tower 12, and a rotor hub 18 that is coupled to a generator 50 (FIG. 2) within the nacelle 14 through powertrain components, such as a drive shaft and gearing. The tower 12 may be fabricated from tubular steel or other suitable material. The rotor hub 18 includes one or more rotor blades 16 coupled to and extending radially outward from the hub 18.

The rotor blades 16 may generally have any suitable length that enables the wind turbine 10 to function according to design criteria. The rotor blades 16 rotate the rotor hub 18 to enable kinetic energy to be transferred from the wind into usable mechanical energy, and subsequently, electrical energy. Specifically, the hub 18 is rotationally coupled to the electric generator 50 positioned within the nacelle 14 for production of electrical energy.

As depicted generally in FIG. 1, the wind turbine 10 may also include a wind turbine control controller 20 located within the nacelle 14 or at any other suitable location. The controller 20 may include suitable processors and/or other processing functionality configured to control the operational aspects of the wind turbine 10, as well as functions described herein related to the deicing functionality. For instance, the controller 20 may control the pitch angle of the rotor blades 16, either individually or simultaneously, by transmitting suitable control signals to a pitch drive or pitch adjustment system within the nacelle 14. Further, as the direction of the wind changes, the controller 20 may be configured to control the position of the nacelle 14 relative to a yaw axis via a yaw drive mechanism within the nacelle 14 to position the rotor blades 16 with respect to the wind direction. The controller 20 is configured to control various operating characteristics of the power generating components, including generator 50, as is appreciated by those skilled in the art.

Referring generally to FIG. 2, the wind turbine system 10 comprises a turbine portion 32 that is operable to convert the mechanical energy of the wind into a rotational torque ($T_{Aero}$) and a generator portion 34 that is operable to convert the rotational torque produced by the turbine portion 32 into electrical power. A drive train 36 is provided to couple the turbine portion 32 to the generator portion 34.

The wind turbine system 10 also comprises a modulating system 38 that is operable to control the torque produced by the generator portion 34 to induce vibrations in the blades 16 in order to break or shake-off ice that has formed on the blades. The turbine portion 32 comprises the rotor 18 and a turbine rotor shaft 40 that is coupled to the rotor 18. Rotational torque is transmitted from the rotor shaft 40 to a generator shaft 42 via the drive train 36. In certain embodiments, such as that embodiment illustrated in FIG. 2, the drive train 36 includes a gear box 44 transmitting torque from a low speed shaft 46 coupled to the rotor shaft 40 to a high speed shaft 48 coupled to the generator shaft 42. The turbine rotor shaft 40 is rotationally coupled to a low speed shaft 42 of a gear box 44 that is provided to transmit rotational torque from the low speed shaft 42 to a high speed shaft 46. The high speed shaft 46 is, in turn, coupled to a generator shaft 48. The generator shaft 48 is coupled to the rotor (not shown) of an electrical generator 50. As the speed of the turbine rotor 40 fluctuates, the frequency of the output 52 of the generator 50 also varies. The generator portion 34 also comprises a frequency converter 54 that is used to convert the variable frequency output 52 of the generator 50 into a fixed frequency output 56 for supply to a power grid 58.

It should be appreciated that the configuration depicted in FIG. 2 is for illustrative purposes, and that the invention is not limited to any particular type of generator portion 34. For example, the generator 50 may be a permanent magnet generator is certain embodiments. In other embodiments, the generator 50 may be a direct drive generator without a drive train 36 or gear box 44.

The generator 50 produces an air gap torque, also referred to as generator torque ($T_{Gen}$), which opposes the aerodynamic torque ($T_{Aero}$) of the turbine rotor 18. The generator 50 of the present embodiment comprises a doubly fed induction drive that enables the air gap torque to be controlled independently of the torque produced by the turbine rotor 40. In the illustrated embodiment, the air gap torque ($T_{Gen}$) of the generator 50 is controlled by the frequency converter 54.

The modulating system 38 may be integrally configured with the wind turbine controller 20 (FIG. 1), or may be separately implemented and in communication with the controller 20. In the illustrated embodiment, the modulating system 38 includes a controller 60, a modulator 62, and one or more sensors 22. The modulator 62 is configured to modulate the generator torque ($T_{Gen}$) upon receipt of a signal/command of detected conditions that are indicative of ice formation on the turbine blades 16. By doing so, vibrations are induced upstream in the turbine blades 16 to shake loose ice that may have formed on the blades. The modulator 62 may be in communication with one or more sensors 22 (directly or via the controller 60) disposed so as to detect operating or environmental conditions that are indicative of ice formation on the turbine blades 16. These sensors 22 may detect, for example, any one or combination of wind speed, rotor speed, power generated by the wind turbine, temperature, or humidity. The sensors 22 may be dedicated to the deicing system 38, or may be used for other control functions by the wind turbine controller 20.

In normal operation, the controller 60 receives a signal representative of generator shaft speed ($N_{Gen}$) provided by a speed sensor 64 and provides a signal 66 to direct the generator 50 to produce a generator torque corresponding to demand on the generator ($T_{Dem}$) that is based on the speed signal. The generator demand torque ($T_{Dem}$) at a given generator speed is the generator torque necessary to obtain maximum power efficiency of the generator 50 at the given generator speed. The controller 60 establishes the signal 66 to produce the generator demand torque ($T_{Dem}$) based on a relationship between generator speed and generator torque. The relationship may comprise a mathematical function between generator speed and generator torque to optimize generator power output. In this embodiment, the function is defined such that generator torque is proportional to the square of the generator speed for generator speeds lower than a rated speed and is constant and equal to a maximum nominal torque for generator speeds greater than the rated speed. In a different embodiment, the relationship may comprise a look up table containing generator torque values corresponding to generator speed values to produce maximum power.

As discussed above, the modulator 62 is provided to control the generator torque ($T_{Gen}$) so as to induce vibrations back through the drivetrain 36 to the turbine blades 16. In a particular embodiment, these induced vibrations are generated at a natural or resonant frequency of the blades 16, as discussed in greater detail below. The signal 66 produced by the controller 60 is modulated by a signal 68 from the modulator 62, represented by a junction 70. The modulated signal 72 is coupled to the frequency converter 54 to produce the generator torque ($T_{Gen}$). The frequency converter 54 receives the modulated signal 72 and is operable to provide an excitation signal 73 to the windings (not shown) of the generator 50, thereby controlling the air gap torque ($T_{Gen}$) of the generator 50. The controller 60 may comprise a signal processor configured to calculate generator demand torque for a sensed generator speed from a defined speed-torque relationship residing in the hardware or software. In one embodiment, the controller 60 comprises a proportional integral (PI) controller. The frequency converter 54 may include, for example a cycloconverter, or a rectifier-inverter pair linked by a direct current (DC) bus.

As appreciated by those skilled in the art, angular accelerations and decelerations of the rotor 18 sets up torque oscillations in the blades 16, as well as in the drive train components 36. The deicing system is configured to modulate the generator demand torque ($T_{Dem}$), thereby controlling the generator torque in such a way as to temporarily induce vibrations in the blades at their resonant frequency. This ensures an adequate "shaking" of the blades 16 to break and loosen ice that may have formed on the blades, and prevents cancelation of the resonant frequency vibrations by the induced vibrations. The modulating signal 68 is thus based on the natural or resonant frequencies of the turbine blades 16.

In the illustrated embodiment, the resonant frequencies of the turbine blades 16 are computed on-line via a detection system 74, which provides the computed resonant frequencies to the modulator 62. The detection system 74 periodically samples (directly or indirectly) turbine blade vibrations via any manner of suitable motion detector 75 (FIG. 1). A detector 75 may be individually configured with each blade 16, as depicted in FIG. 1, or with only one of the blades 16. A detector 75 may be configured with the rotor hub 18, wherein vibrations in the hub are a function of the blade vibrations. The detectors 75 are in communication with the deicing system 38 and/or system controller 20 via blade power/transmission lines 26 or tower power/transmission line 28. The detection system 74 converts the blade/hub vibrations from the time domain to the frequency domain. In one embodiment, the detection system 74 comprises a computer with data processing software adapted to compute blade/hub resonant frequencies via a Fourier transform-based algorithm. In a different embodiment, the detection system 74 may be adapted to determine blade/hub resonant frequency by sampling blade/hub acceleration, which is sensed by a suitably disposed accelerometer.

FIG. 3 is a flow diagram illustrating aspects of various methods for deicing a wind turbine blade. The exemplary method 200 may be performed by processing logic that may include hardware (circuitry, dedicated logic, etc.), software, or a combination of both. The exemplary process 200 may be carried out with the system components discussed above, or with any other suitable system configuration. In general, the method 200 includes detecting the actual or likely formation of ice on the wind turbine blades and modulating generator torque to induce vibrations in the blades sufficient to shake any such ice off of the blades. At block 202 in FIG. 3, the method, which may be implemented within a system controller 20 (FIG. 1) or modulating system 38 (FIG. 2), monitors conditions that are indicative of ice formation on a wind turbine blade by any combination of sensors. These conditions may include, for example, any one or combination of wind speed, rotor speed, power generated by the wind turbine, temperature, or humidity. At block 204, a determination is made (from the monitored conditions) that ice has formed on one or more of the turbine blades, or that conditions are favorable for the formation of ice. At block 206, in response to detected icing conditions, the method entails modulating generator torque so as to induce upstream vibrations in the turbine blades to shake loose ice that may have formed on the turbine blades. This step may include pitching the turbine blades to a neutral position prior to modulating the generator torque. The modulation step may also include determining a natural resonant frequency of the turbine blades, and modulating the generator torque at the blade resonant frequency. At block 208, the modulation is conducted until the icing conditions have cleared or fallen below a threshold vale (e.g. actual ice has been removed from the blades) or for a predetermined period of time. The modulation may also be periodically conducted during times when the detected conditions are favorable for ice formation on the turbine blades regardless of actual ice formation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for deicing turbine blades of a wind turbine, wherein rotational torque from a rotor hub on which the turbine blades are mounted is transmitted to a generator, the method comprising:
    detecting conditions that are indicative of ice formation on a wind turbine blade; and
    in response to detected icing conditions, modulating generator torque so as to induce upstream vibrations in the turbine blades to shake loose ice that may have formed on the turbine blades.

2. The method as in claim 1, further comprising pitching the turbine blades to a neutral position prior to modulating the generator torque.

3. The method as in claim 1, further comprising determining a natural resonant frequency of the turbine blades, and modulating the generator torque at the blade resonant frequency.

4. The method as in claim 1, comprising continuing to modulate generator torque until the detected icing conditions fall below a threshold value.

5. The method as in claim 1, comprising continuing the modulate generator torque for a defined time period.

6. The method as in claim 1, wherein the method is periodically conducted during times when the detected conditions are favorable for ice formation on the turbine blades regardless of actual ice formation.

7. The method as in claim 6, wherein the detected conditions are determined by monitoring any one or combination of wind speed, rotor speed, power generated by the wind turbine, temperature, or humidity.

8. A wind turbine, comprising:
   a plurality of turbine blades mounted to a rotor;
   a generator, said rotor rotationally coupled to said generator via a powertrain such that rotational torque is transferred from said rotor to said generator; and
   a modulating system operably coupled to said generator and configured to modulate generator torque upon detection of conditions that are indicative of ice formation on said turbine blades so as to induce upstream vibrations in said turbine blades to shake loose ice that may have formed on said turbine blades.

9. The wind turbine as in claim 8, wherein said modulating system is in communication with one or more sensors disposed so as to detect operating or environmental conditions that are indicative of ice formation on said turbine blades.

10. The wind turbine as in claim 9, wherein said sensors are disposed so as to monitor any one or combination of wind speed, rotor speed, power generated by the wind turbine, temperature, or humidity.

11. The wind turbine as in claim 8, wherein said modulating system is configured to determine a natural resonant frequency of said turbine blades, and to modulate the generator torque at the blade resonant frequency.

12. The wind turbine as in claim 11, further comprising a motion sensor configured with said turbine blades and in communication with said modulating system for transmitting vibrational frequency information to said modulating system.

13. The wind turbine as in claim 11, further comprising a motion sensor configured with said rotor and in communication with said modulating system for transmitting vibrational frequency information to said controller.

14. The wind turbine as in claim 8, wherein said modulating system is configured to modulate generator torque until the detected icing conditions fall below a threshold value.

15. The wind turbine as in claim 8, wherein said modulating system is configured to modulate generator torque for a defined time period after detection of conditions that are indicative of ice formation.

16. The wind turbine as in claim 8, wherein said modulating system is configured to periodically modulate generator torque during times when the detected conditions are favorable for ice formation on the turbine blades regardless of actual ice formation.

* * * * *